UNITED STATES PATENT OFFICE.

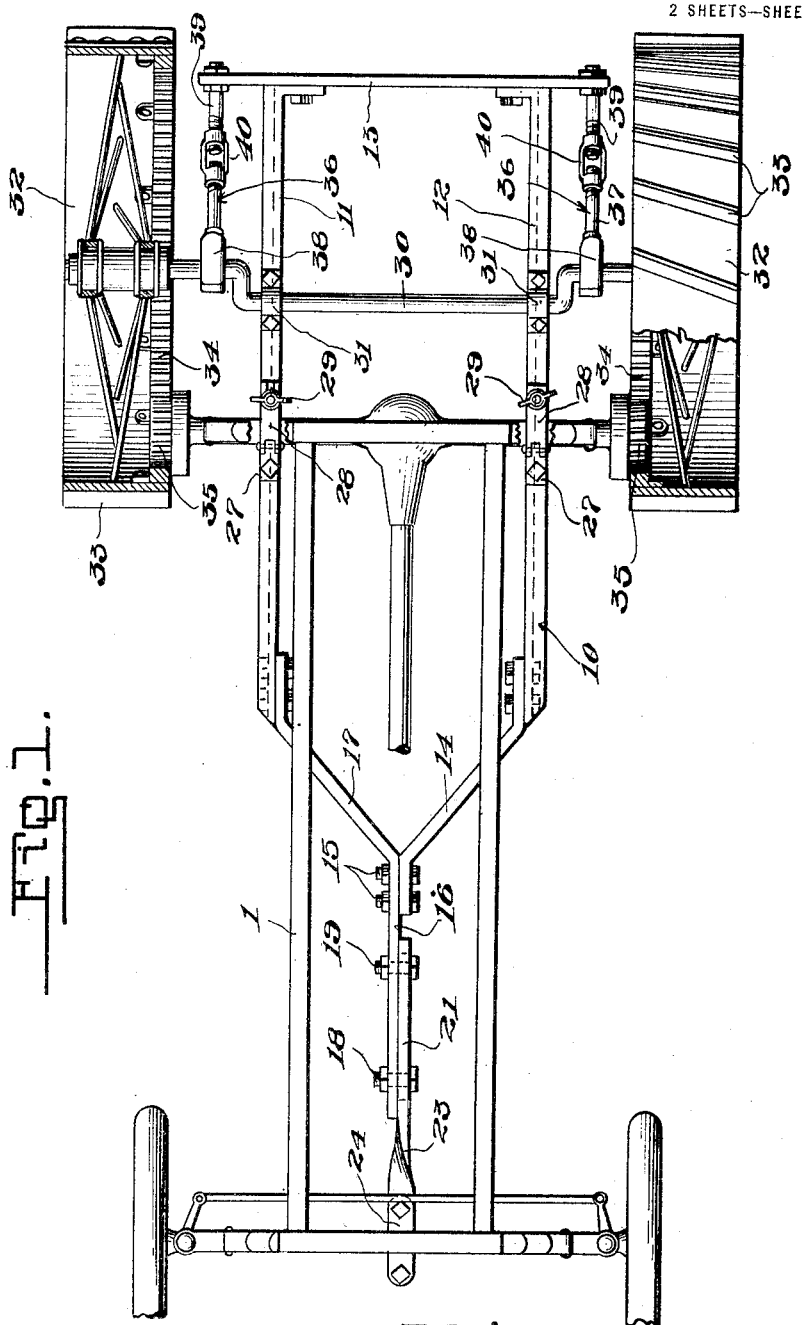

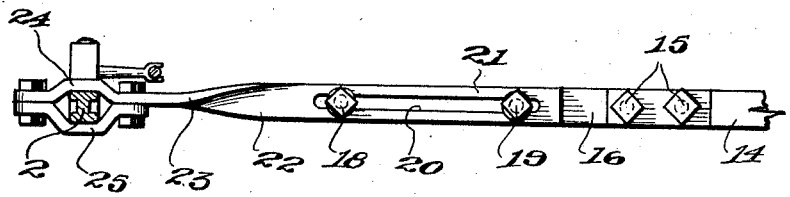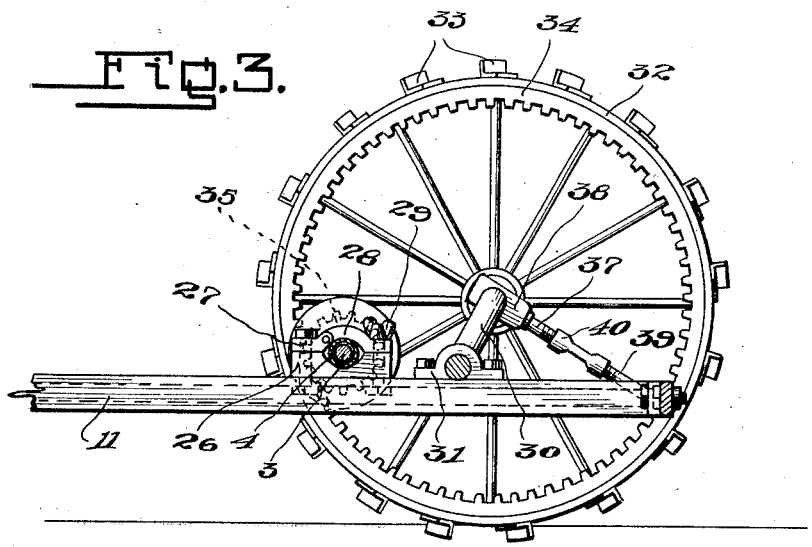

LUCULLUS G. LINCECUM, OF CHICAGO, ILLINOIS, ASSIGNOR OF ONE-HALF TO BIRDYE BINKOWITZ, OF KANSAS CITY, MISSOURI.

TRACTOR ATTACHMENT FOR AUTOMOBILES.

1,375,791.

Specification of Letters Patent.

Patented Apr. 26, 1921.

Application filed February 5, 1919. Serial No. 275,148.

*To all whom it may concern:*

Be it known that I, LUCULLUS G. LINCECUM, a citizen of the United States, residing at Chicago, in the county of Cook and State of Illinois, have invented certain new and useful Improvements in Tractor Attachments for Automobiles, of which the following is a specification.

This invention relates to a tractor attachment for pleasure automobiles which may be attached to any approved type of automobile, to permit the automobile to perform heavy work, such as drawing agricultural implements.

An object of the invention is to provide a tractor attachment as specified, embodying a pair of pull wheels each carrying a rack which meshes with a pinion mounted upon the rear axle of an automobile, for rotating the pull wheel to propel the automobile, and also includes a frame adapted for attachment to both the front and rear axles of the vehicles to distribute the strain to both axles in lieu of to the rear axle alone, as is ordinarily the case in tractor attaching means and further to make the frame adjustable longitudinally for permitting its attachment to automobiles having different wheel bases.

A further object of the invention is to mount said pull wheels upon a crank axle to which are connected a pair of longitudinally adjustable arms carried by the frame of the tractor attachment, and adapted for adjustment as to length, to move the rack or gear teeth carried by the pull wheels into and out of meshing engagement with the rear axle carried pinion.

Other objects of the invention will appear in the following detailed description taken in connection with the accompanying drawings, forming a part of this specification and in which drawings:

Figure 1 is a top plan view, partly in section, of a tractor attachment showing the same applied to the frame of an automobile.

Fig. 2 is a fragmentary side elevation of the frame of a tractor attachment showing the manner of attaching it to the front axle of an automobile, and Fig. 3 is a fragmentary longitudinal section through the rear end of the tractor attachment.

Referring more particularly to the drawings, 1 indicates the chassis of an ordinary motor vehicle, including a front axle 2, and a rear axle 3 of the ordinary construction. The tractor attachment generically indicated by the numeral 10 comprises a frame including a pair of rear side rails 11 and 12, the rear ends of which are connected by draw or cross bars 13. An angled bar 14 is connected to the front end of the side rail 12 and its forward end is detachably connected in any suitable manner, such as by bolts as indicated at 15 to the forwardly extending portions 16 of the angled bar 17. The angled bar 17 is connected to the forward end of the side rail 11. The forwardly extending portion 16 carries a pair of spaced bolts 18 and 19 which engage through a slot 20 formed in the rear end 21 of a bar 22. The bar 22 is twisted intermediate its end, as shown at 23 to position its forward end in a horizontal plane, and this forward end is bent to engage over the front axle 2 as shown at 24. A clamping plate 25 engages beneath the front axle 22 and is secured to the horizontal portion of the bar 22, for connecting the frame 10 of the tractor structure to the front axle 2 of the motor vehicle.

The side rails 11 and 12 have bearings 26 carried thereby which engage the casing 4 of the rear axle 3 to support the rear axle from the frame of the tractor attachment. The upper portions of the bearings 26 comprises relatively stationary sections 27 and pivotally mounted sections 28 which are adapted to swing upon their pivots to permit the receiving of the axle 3 in the bearings in the lower section 26 of the bearing block. The upper pivoted section 28 is clamped in closed position by any suitable means, such as nuts 29, for preventing accidental movement of the shaft 3 and casing 4 out of the bearings.

A crank axle 30 is rockably supported by bearings 31 which are carried by the side rails 11 and 12 rearwardly of bearings 26 and this crank axle has pull wheels 32 mounted upon its spindle end. The pull wheels 32 have the usual type of peripheral grouters or cleats 33 to facilitate the tractive action of the wheels and they also have crown internal gears 34 carried thereby at their inner edges and attached to the inner surface of their ribs. The teeth of the internal gears 34 are adapted to mesh with pinions 35 which are mounted upon the spindle of the rear axle 3 in lieu of the ordinary wheels of the automobile.

Longitudinally adjustable members 36 are connected to the crank axle 30 and to the laterally projecting ends of the draw bar or rear cross bar 13. These members 36 comprise rods 37 which have heads 38 upon their forward ends engaging the crank axle 30 and rods 39, the rear ends of which are connected to the draw bar 13. The rods 37 and 39 are connected by turn buckles 40 by means of which the length of the members 36 may be adjusted for adjusting the position of the axle 30 or to rock the axle 30 in its bearings 31 to position the pull wheel 32 so that the internal gears 34 will mesh with the pinions 35.

The power is transmitted to the pull wheel 32 from the rear axle of the automobile, through the medium of the pinions 35 and by provision of the bar 22, the frame will be connected to the front axle of the vehicle, for partially distributing thereto the strain of the article to be drawn by the automobile.

Changes in details may be made without departing from the spirit of this invention, but;

I claim:

1. In a tractor attachment for automobiles, a frame adapted to lie beneath the chassis of an automobile and having bearings in which to receive the rear axle of the automobile, ground wheels at the rear of the frame, means on the rear axle coöperating with the wheels to drive the same, a shaft journaled in the rear portion of the frame and having crank portions to receive the wheels, said crank portions permitting the wheels to be swung upwardly and forwardly from the position they occupy when the gear elements are enmeshed, said shaft being positioned forwardly of the rear end of the frame, and adjusting means positioned directly between the crank portions and the rear end of the frame.

2. In a tractor attachment for automobiles, a frame adapted to lie beneath the chassis of an automobile and having openable bearings in which to removably receive the rear axle of the automobile, an adjustable bar at the forward part of the frame attachable to the front axle of the automobile, ground wheels at the rear of the frame, coöperating gear elements on the rear axle and wheels, a shaft journaled in the rear portion of the frame and having crank portions to receive the wheels, said crank portions permitting the wheels to be swung upwardly and forwardly from the position they occupy when the gear elements are enmeshed, said shaft being positioned forwardly of the rear end of the frame, and adjusting means positioned directly between the crank portions and the rear end of the frame.

3. In a tractor attachment for automobiles, a frame composed of side rails, forwardly converging bars at the front thereof, a slotted bar attached at a plurality of points to one of the first-named bars and having attachment to the front axle of the automobile, bearings on the rails to support the automobile rear axle, upwardly and forwardly swinging ground wheels supporting the frame at a point advanced from the rear end thereof, adjusting means connected to the rear end of the frame for varying the positions of the wheels, and drive means between the wheels and rear automobile axle.

LUCULLUS G. LINCECUM.